(12) United States Patent
Simonis et al.

(10) Patent No.: US 10,926,817 B2
(45) Date of Patent: Feb. 23, 2021

(54) PROTECTIVE COVERING FOR A FLAT SPIRAL SPRING HOUSING, FLAT SPIRAL SPRING HOUSING ARRANGEMENT, AND VEHICLE HAVING A FLAT SPIRAL SPRING HOUSING ARRANGEMENT OF THIS TYPE

(71) Applicant: Valeo Schalter und Sensoren GmbH, Bietigheim-Bissingen (DE)

(72) Inventors: Karl Simonis, Bietigheim-Bissingen (DE); Daniela Pikart, Bietigheim-Bissingen (DE); Laurent Raddaz, Bietigheim-Bissingen (DE); Uwe Hertl, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 357 days.

(21) Appl. No.: 15/769,208

(22) PCT Filed: Oct. 10, 2016

(86) PCT No.: PCT/EP2016/074177
§ 371 (c)(1),
(2) Date: Apr. 18, 2018

(87) PCT Pub. No.: WO2017/071939
PCT Pub. Date: May 4, 2017

(65) Prior Publication Data
US 2018/0304943 A1  Oct. 25, 2018

(30) Foreign Application Priority Data

Oct. 29, 2015  (DE) ................ DE10 2015 118 543.1

(51) Int. Cl.
*B62D 55/088* (2006.01)
*B62D 55/108* (2006.01)
*B60R 16/027* (2006.01)

(52) U.S. Cl.
CPC .......... *B62D 55/088* (2013.01); *B60R 16/027* (2013.01); *B62D 55/108* (2013.01)

(58) Field of Classification Search
CPC ........................... B62D 55/088; B60R 16/027
See application file for complete search history.

(56) References Cited

U.S. PATENT DOCUMENTS

| 4,475,779 A | 10/1984 | Fohl |
| 5,137,463 A | 8/1992 | Sasaki et al. |
| (Continued) | | |

FOREIGN PATENT DOCUMENTS

| CN | 1117281 A | 2/1996 |
| DE | 40 27 952 A1 | 3/1992 |
| (Continued) | | |

OTHER PUBLICATIONS

International Search Report issued in PCT/EP2016/074177 dated Jan. 3, 2017 (3 pages).

(Continued)

*Primary Examiner* — Tony H Winner
(74) *Attorney, Agent, or Firm* — Osha Bergman Watanabe & Burton LLP

(57) ABSTRACT

The invention relates to a protective covering (4) for sealing a flat spiral spring housing (2), to a flat spiral spring housing arrangement having a protective covering (4), and to a vehicle having a flat spiral spring housing arrangement of this type. The protective covering (4) has a first housing part (2A) and a second housing part (2B) which forms a housing cover, the first housing part (2A) forming, with the second housing part (2B), a receiving space for a flat spiral spring (3), and the two housing parts (2A, 2B) being rotatable with respect to one another. To this end, the flat spiral spring housing (2) has a gap between the first housing part (2A) and the second housing part (2B). The protective covering (4)

(Continued)

Figure 1:
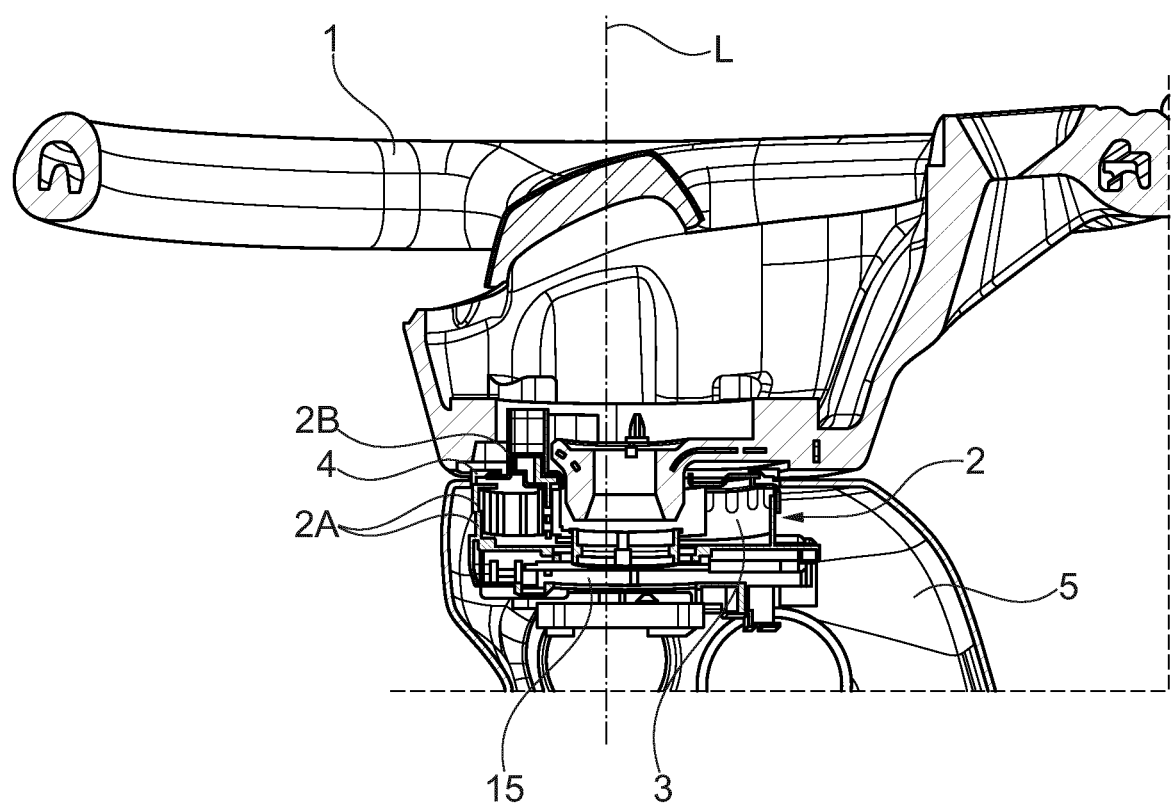

has an annular disc (9) which extends in the radial direction, and a wall section (10) which adjoins an outer edge of the annular disc (9) and extends in the axial direction, it being possible for the protective covering (4) to be connected to the flat spiral spring housing (2) in such a way that, in a functional state in which it is connected to the flat spiral spring housing (2) to form a flat spiral spring housing arrangement, the protective covering (4) covers the gap between the first housing part (2A) and the second housing part (2B) of the flat spiral spring housing (2) from the outside.

18 Claims, 3 Drawing Sheets

(56) References Cited

U.S. PATENT DOCUMENTS

| | | | |
|---|---|---|---|
| 5,314,344 A | 5/1994 | Ida et al. | |
| 5,429,517 A | 7/1995 | Bolen | |
| 5,630,723 A * | 5/1997 | Kawamoto | B60R 16/027 439/15 |
| 6,437,886 B1 * | 8/2002 | Trepanier | G02B 5/1857 359/1 |
| 6,641,414 B2 * | 11/2003 | Rebhan | B60R 16/027 439/164 |
| 6,962,497 B2 | 11/2005 | Wade et al. | |
| 7,104,821 B2 * | 9/2006 | Araki | B60R 16/027 439/164 |
| 2001/0048044 A1 | 12/2001 | Sugata | |
| 2004/0063347 A1 * | 4/2004 | Hayashi | B60R 16/027 439/164 |
| 2014/0353415 A1 * | 12/2014 | Katsuramaki | H02G 11/02 242/371 |
| 2015/0001327 A1 * | 1/2015 | Hamada | B65H 75/48 242/376 |

FOREIGN PATENT DOCUMENTS

| | | |
|---|---|---|
| DE | 695 05 861 T2 | 5/1999 |
| DE | 101 25 403 A1 | 12/2002 |
| EP | 0 646 497 A1 | 4/1995 |
| JP | 2531358 Y2 | 4/1997 |
| JP | 2000-048924 A | 2/2000 |
| JP | 2001-341945 A | 12/2001 |
| JP | 2007-227163 A | 9/2007 |
| KR | 20-2014-0002616 U | 5/2014 |

OTHER PUBLICATIONS

Written Opinion of the International Searching Authority issued in PCT/EP2016/074177 dated Jan. 3, 2017 (5 pages).
German Search Report issued in DE 10 2015 118 543.1 dated Jul. 28, 2016 (10 pages).
Notification of Reason for Rejection issued in corresponding Japanese Application No. 2018-521956, dated Jul. 19, 2019 (10 pages).
Notice of Preliminary Rejection in corresponding Korean Application No. 2018-7011927, dated Sep. 2, 2019 (13 pages).
First Office Action in corresponding Chinese Application No. 201680061154.9, dated Jun. 29, 2020 (14 pages).

* cited by examiner

PROTECTIVE COVERING FOR A FLAT SPIRAL SPRING HOUSING, FLAT SPIRAL SPRING HOUSING ARRANGEMENT, AND VEHICLE HAVING A FLAT SPIRAL SPRING HOUSING ARRANGEMENT OF THIS TYPE

The invention relates to a protective covering for sealing a flat spiral spring housing, the flat spiral spring housing having a first housing part and at least a second housing part which forms a housing cover. Here, the first housing part forms, with the second housing part, a receiving space for a flat spiral spring, the two housing parts being rotatable with respect to one another. To this end, the flat spiral spring housing has a gap between the first housing part and the second housing part.

Furthermore, the invention relates to a flat spiral spring housing arrangement having an above-described flat spiral spring housing and a protective covering, and to a vehicle, in particular a double-track vehicle, having a flat spiral spring housing arrangement which has an above-described flat spiral spring housing and an above-described protective covering.

Flat spiral spring housings for receiving a flat spiral spring are well known from the prior art, flat spiral springs being spirally wound cables, in particular flat ribbon cables, which have a plurality of electric conductors which are insulated electrically from one another. As a result of the spiral winding which makes a resilient, flexible and therefore compensating cable connection possible, flat spiral springs are suitable, in particular, for the transmission of signals, such as electric voltage and/or the like, between components which can be moved relative to one another, such as a steering wheel and a steering column module.

Flat spiral springs are used, above all, in motor vehicles, in particular for the transmission of signals between components which are integrated into the rotationally movable steering wheel, such as an airbag or a steering wheel heater, and associated components which are arranged in the vehicle in a stationary manner, such as an associated airbag control unit.

Here, the flat spiral springs are usually received in the steering wheel or in the control stalk housing, the flat spiral springs being arranged to this end directly in the steering wheel or the control stalk housing or else in a separate flat spiral spring housing which can be inserted into the steering wheel or the control stalk.

A variety of embodiments of flat spiral spring housings are known from the prior art, for example from U.S. Pat. Nos. 5,314,344, 6,962,497 B2 or DE 101 25 403 A1.

A flat spiral spring housing usually has a first housing part and at least a second housing part which forms a housing cover, the two housing parts being rotatable with respect to one another and forming a receiving space for a flat spiral spring. Here, one of the housing parts forms what is known as a stator and can be fastened in a vehicle in a stationary manner with respect to the vehicle body, for example to a steering column module or the like, whereas the other housing part forms a rotor and can be fastened fixedly to the steering wheel or a steering column so as to rotate with it, with the result that said housing part can follow a rotational movement of the steering wheel and can be rotated with respect to the stationary housing part.

In order to achieve a satisfactory rotational movability of the two housing parts with respect to one another, there is as a rule a gap, even if often only a very small gap, between the first housing part and the second housing part. In order to avoid the penetration of foreign bodies into the flat spiral spring housing, different possibilities are known, such as a special flat spiral spring housing design, inserting seal devices or using protective coverings.

It is an object of the present invention to provide an alternative protective covering for sealing a flat spiral spring housing, which protective covering is, in particular, of particularly simple construction but is extremely effective and by way of which, in particular, the penetration of foreign bodies into the interior of a flat spiral spring housing can be avoided reliably. Furthermore, it is an object of the invention to provide a corresponding flat spiral spring housing arrangement with a flat spiral spring housing and a protective covering, and to provide a corresponding vehicle with a flat spiral spring housing arrangement.

According to the invention, said object is achieved by way of a protective covering, by way of a flat spiral spring housing arrangement, and by way of a vehicle having the features according to the respective independent patent claims. Advantageous embodiments of the invention are the subject matter of the dependent patent claims, the description and the figures, and will be described in greater detail in the following text. The wording of the claims is made the contents of the description by way of express reference. In order to avoid repetitions, some of the following, stated features are described in part only once, that is to say only in conjunction with the protective covering, the flat spiral spring housing arrangement or the vehicle, but apply, independently of one another, to the protective covering and to the flat spiral spring housing arrangement and to the vehicle.

A protective covering according to the invention for a flat spiral spring housing is distinguished by the fact that the protective covering has an annular disc which extends in the radial direction at least over part of a circumference and a wall section which adjoins an outer edge of the annular disc and extends at least over part of the circumference in the axial direction, it being possible for the protective covering to be connected to the flat spiral spring housing in such a way that, in a functional state in which it is connected to the flat spiral spring housing to form a flat spiral spring housing arrangement, the protective covering covers the gap between the second housing part and the first housing part of the flat spiral spring housing from the outside.

Here, within the context of this application, the positional and directional designations "top", "bottom", "radial" and "axial" which are used relate in each case to the rotational axis, about which one of the two housing parts of the flat spiral spring housing can be rotated in a functional installed state in a vehicle, the positional designation "top" denoting a side which faces the steering wheel of a vehicle, the positional designation "bottom" denoting a side which faces the steering column module, the specification "axial" meaning along an axis parallel to the rotational axis or along the rotational axis, and "radial" correspondingly meaning in a plane perpendicularly with respect to the rotational axis and so as to intersect the rotational axis.

In the context of this application, in the radial direction therefore means in a plane perpendicularly with respect to the rotational axis of a steering column or a steering wheel, in relation to a functional installed state in a vehicle, so as to intersect the rotational axis.

In the context of this application, in the axial direction accordingly means along an axis parallel to the rotational axis of the steering column or the steering wheel or so as to coincide with the rotational axis of the steering wheel or the steering column, in relation to a functional installed state of a protective covering according to the invention or a flat spiral spring housing arrangement according to the invention in a vehicle.

In the context of this application, a gap is understood to mean any non-sealed arrangement of two parts with respect to one another, in particular any non-sealed arrangement with respect to foreign bodies.

Here, the annular disc of the protective covering preferably extends over the entire circumference, that is to say over an angle of 360°, and forms a completely closed annular disc. The axial wall section of the protective covering is likewise preferably of completely circumferential configuration and is therefore of cylinder shell-shaped configuration.

A protective covering according to the invention, in particular a protective covering which has an annular disc of completely circumferential configuration and preferably a wall section of likewise completely circumferential configuration, can provide a protective covering in a simple way, which protective covering seals the gap between the first housing part and the second housing part of a flat spiral spring housing against the penetration of foreign bodies in an extremely effective manner.

A protective covering according to the invention is particularly suitable for a flat spiral spring housing which has a first, cup-shaped housing part with a bottom of annular disc-shaped configuration and with a cylinder shell-shaped wall section, and at least a second housing part which forms a housing cover with at least one annular section which extends in the radial direction and is arranged spaced apart in the axial direction from the annular disc-shaped bottom of the first housing part and, with the first housing part, forms the receiving space for the flat spiral spring, the annular disc-shaped section of the second housing part to this end preferably being arranged spaced apart from the bottom of annular disc-shaped configuration of the first housing part, particularly preferably parallel to the bottom of the first housing part.

Here, the cup-shaped, first housing part of the flat spiral spring housing is preferably provided as a stator and is configured to be arranged in a stationary manner on the vehicle body and to be fastened, for example, in a steering column module or the like, whereas the second housing part is preferably provided to form a rotor and, in particular, is configured to be fastened to the steering column and/or the steering wheel.

Here, a protective covering according to the invention is suitable for sealing flat spiral spring housings of different configuration, in particular, inter alia, for the following three, fundamental types of flat spiral spring housings which differ from one another, above all, in terms of the configuration of the first and second housing part and in terms of the arrangement of the first and second housing part with respect to one another.

In the case of the first type of flat spiral spring housings, as known, for example, from DE 101 25 403 A1, the annular disc-shaped section of the second housing part extends almost as far as the cylinder-shaped wall section of the first housing part, with the result that a flat spiral spring housing of this type has a gap between an outer edge of the annular section of the second housing part and the cylindrical wall section of the first housing part.

In the case of the second type of flat spiral spring housings, in the upper region of the cylindrical wall section, that is to say at an end of the cylinder shell-shaped wall section which faces away from the bottom of the first housing part, the first housing part has a radially inwardly extending flange or annular section which preferably extends in a parallel plane with respect to the annular section of the second housing part and, in particular, overlaps with the latter in a labyrinth-like manner. In the case of flat spiral spring housings of this type, the gap is situated here between the two annular disc-shaped sections of the first housing part and the second housing part which extend in the radial direction.

Here, the first housing part can also be configured in multiple pieces and can be assembled, for example, from a cup-shaped housing part and a likewise cup-shaped cover, the cup-shaped cover having a cylinder shell-shaped axial wall section and an annular disc which adjoins an upper edge of the cylinder shell-shaped wall section in the radial direction and forms an inwardly extending annular section, the cover being connected fixedly to the cup-shaped housing part, and the cylinder shell-shaped axial wall section of the cover bearing at least partially against the axial wall section of the cup-shaped housing part. In this case, the gap is situated here between the inwardly extending annular section of the cover which is connected to the cup-shaped housing part and that section of the second housing part which extends in the radial direction.

Furthermore, a third type of flat spiral spring housings is also known, the second housing part in the case of said flat spiral spring housings having an annular section, the outer end of which is adjoined by a cylinder shell-shaped wall section which extends in the direction of the bottom of the first housing part, preferably outside the first, cup-shaped housing part. That is to say, in other words, in the case of said third type of flat spiral spring housings, the second housing part is likewise of cup-shaped configuration and is arranged with a bottom at the top, that is to say with the bottom in the direction of the steering wheel, in relation to a functional installed state of the flat spiral spring housing in a vehicle. Here, the cylinder shell-shaped wall section or that wall section of the second housing part which extends in the axial direction preferably extends parallel to the cylinder shell-shaped wall section of the first housing part and is arranged, in particular, outside the latter. As a consequence, the gap between the first housing part and the second housing part is therefore situated in the region of the cylinder shell-shaped wall sections.

In order to seal flat spiral spring housings of the first and/or second type, a protective covering according to the invention is configured in one advantageous refinement in such a way and can be connected to the flat spiral spring housing in such a way that the annular disc of the protective covering covers the gap from the outside, the annular disc of the protective covering preferably extending in the radial direction beyond a gap width. Here, the annular disc preferably bears against the first housing part which extends in the radial direction and against the second housing part, in particular lies on them.

In order to seal flat spiral spring housings of the third type with a gap in the region of the cylinder shell-shaped wall section of the first housing part or the second housing part, a protective covering according to the invention is configured in one advantageous refinement in such a way and can be connected to the flat spiral spring housing in such a way that, in a state in which it is connected to the flat spiral spring housing to form a flat spiral spring housing arrangement, the axial wall section of the protective covering covers the gap of the flat spiral spring housing from the outside, the axial wall section of the protective covering to this end preferably extending in the axial direction beyond a gap height.

In one particularly advantageous refinement of a protective covering according to the invention, the protective covering is configured in such a way that, in a state in which it is connected to the flat spiral spring housing to form a flat spiral spring housing arrangement, the axial wall section of the protective covering bears in the radial direction against the first housing part, at least over a part of the circumference, preferably in a completely circumferential manner, and is fixed in the radial direction with respect to the flat spiral spring housing as a result. In this way, radial fixing of the protective covering with respect to the flat spiral spring housing can be realised in a particularly simple and inexpensive manner, the protective covering preferably bearing against the flat spiral spring housing on the outside in the region of the cylinder shell-shaped wall section of the first housing part.

In a further advantageous refinement of a protective covering according to the invention, the protective covering has a plurality of latching elements, in particular elastically resilient latching hooks, in a manner which is distributed in the circumferential direction, preferably in a uniformly distributed manner, on its axial wall section for axial fixing with respect to the flat spiral spring housing, in order to establish a latching connection to the flat spiral spring housing, in particular to the first housing part of the flat spiral spring housing. Here, the latching elements of the protective covering are preferably configured in such a way that they latch behind in each case one projection of corresponding configuration on the flat spiral spring housing, in particular behind in each case projections of corresponding configuration on the cylinder shell-shaped wall section of the first housing part of the flat spiral spring housing. Here, the latching elements of the protective covering are particularly preferably configured as latching lugs or latching hooks which engage under a projection which extends in the radial direction and is arranged on the first housing part, and can be connected in a latching manner to the flat spiral spring housing as a result.

In a further advantageous refinement of a protective covering according to the invention, the protective covering is formed from at least two ring segments, preferably from two half-ring segments. That is to say, the protective covering is preferably formed from two ring halves which in each case extend over a circumferential angle of 180°. The division of the protective covering into at least two separate ring segments, in particular two half-ring segments, makes a radial arrangement or assembly of the protective covering from the outside around the flat spiral spring housing possible, with the result that no axial assembly or axial pushing of the protective covering onto the flat spiral spring housing is required. As a result, the protective covering can also be connected subsequently to the flat spiral spring housing, that is to say also after the installation of the flat spiral spring housing into a vehicle, in particular without it being necessary for the steering wheel to be dismantled.

In a further advantageous refinement of a protective covering according to the invention, two first, adjacent ring segment ends are connected to one another by means of a hinge, preferably by means of an integral hinge. Here, in particular, only the axial wall sections of the ring segment ends are connected to one another by means of the hinge, and not the ring segment ends of the annular disc.

In a further advantageous refinement of a protective covering according to the invention, two other, adjacent ring segment ends can be connected to one another or are connected to one another by means of a latching connection.

If the protective covering is formed by way of two ring segments, in particular by way of two half-ring segments, the two half-ring segments are preferably connected at two first, adjacent ring segment ends by means of a hinge, in particular by means of an integral hinge, and at the other two, second ring segment ends by means of a latching connection, or they can preferably be connected to one another at the other two ring segment ends by means of a latching connection. A protective covering which is configured in this way can be connected in a particularly simple manner to a flat spiral spring housing which has already been installed into a vehicle, since the protective covering can be folded open correspondingly and can be laid around the flat spiral spring housing from the outside, and merely the two second ring segment ends have to be connected by means of the latching connection, in order to fix the protective covering radially around the flat spiral spring housing. In addition, if present, merely the latching elements on the axial wall sections of the protective covering are to be brought into engagement with the corresponding projections on the flat spiral spring housing and are to be latched correspondingly for axial fixing.

In a further advantageous refinement of a protective covering according to the invention, the annular disc of the protective covering has a surface with a low roughness, in particular a surface with a low coefficient of friction, on a side which faces the housing part which is configured as a rotor and/or a side which faces the steering wheel in a functional installed state in a vehicle. As a result, a friction which occurs between the housing part which is configured as a rotor and/or the steering wheel and/or other components and the protective covering can be reduced.

In a further advantageous refinement of a protective covering according to the invention, in a functional installed state of the protective covering in a vehicle, at least the side which faces the housing part which is configured as a rotor and/or that side of the annular disc of the protective covering which faces the steering wheel have/has an anti-static surface. However, the entire protective covering preferably has an anti-static surface; in particular, the entire protective covering is of anti-static configuration. As a result, electric charging of the protective covering can be reduced or avoided.

A flat spiral spring housing arrangement according to the invention has a flat spiral spring housing and an above-described protective covering according to the invention, the flat spiral spring housing having a first housing part and at least a second housing part which forms a housing cover, the first housing part forming, with the second housing part, a receiving space for a flat spiral spring, the two housing parts being rotatable with respect to one another, and the flat spiral spring housing having a gap between the first housing part and the second housing part, which gap is covered by way of the protective covering from the outside. Here, the protective covering preferably seals the gap, in particular against the penetration of foreign bodies.

In a further advantageous refinement of a flat spiral spring housing arrangement according to the invention, the flat spiral spring housing has a first, cup-shaped housing part with a bottom of annular disc-shaped configuration and with a cylinder shell-shaped wall section, and at least a second housing part which forms a housing cover with at least one annular disc-shaped section, the annular section of the second housing part extending in the radial direction and being arranged spaced apart in the axial direction from the annular disc-shaped bottom of the first housing part, and forming, with the first housing part, the receiving space for a flat spiral spring, and the gap being situated between the first housing part and the second housing part.

In one preferred, advantageous refinement of a flat spiral spring housing arrangement according to the invention, the annular disc of the protective covering covers the gap in the flat spiral spring housing from the outside, the annular disc of the protective covering to this end preferably extending in the radial direction beyond a gap width and, in particular, being of completely circumferential configuration.

Here, the annular disc particularly preferably bears against or lies on the annular disc-shaped section of the second housing part. If the first housing part is of multiple-piece configuration and has a corresponding flange or annular disc-shaped section which extends inwards in the radial direction, the annular disc of the protective covering can also lie on this.

In a further advantageous, alternative or additional refinement of a flat spiral spring housing arrangement according to the invention, the axial wall section of the protective covering covers the gap from the outside, said axial wall section to this end preferably extending in the axial direction beyond a gap height and, in particular, being of completely circumferential configuration.

In a further advantageous refinement of a flat spiral spring housing arrangement according to the invention, the axial wall section of the protective covering bears in the radial direction on the outside against the flat spiral spring housing, preferably against the first housing part, in particular in a completely circumferential manner, and is fixed as a result in the radial direction with respect to the flat spiral spring housing.

In a further advantageous refinement of a flat spiral spring housing arrangement according to the invention, the protective covering is connected to the flat spiral spring housing by means of a plurality of latching connections which are preferably arranged uniformly distributed in the circumferential direction, for axial fixing with respect to the flat spiral spring housing. To this end, the protective covering preferably has a plurality of latching elements, preferably elastically resilient latching hooks, in particular in a manner which is distributed in the circumferential direction on its axial wall section, in particular in a uniformly distributed manner. The flat spiral spring housing preferably has a plurality of latching projections of corresponding configuration, said latching projections particularly preferably being arranged on the cylinder shell-shaped wall section of the first housing part. Here, the latching hooks of the protective covering preferably engage behind or below the latching projections on the flat spiral spring housing and thus form corresponding latching connections, with the result that the protective covering is fixed in the axial direction on the flat spiral spring housing and is connected to the latter.

A vehicle according to the invention, in particular a double-track vehicle according to the invention, having a flat spiral spring housing arrangement with a flat spiral spring housing and a protective covering has a flat spiral spring housing arrangement according to the invention and a protective covering according to the invention.

Here, the first housing part of a protective covering according to the invention is preferably configured as a stator and is fastened in a stationary manner to the vehicle, in particular to a longitudinal stalk housing or the like. The second housing part of the flat spiral spring housing is preferably configured as a rotor and is fastened to the steering column and/or the steering wheel.

Here, in particular in the region of its axial wall section, the protective covering according to the invention which is connected to the flat spiral spring housing to form a flat spiral spring housing arrangement is preferably surrounded at least partially by a trim panel in such a way that the protective covering is additionally fixed in the radial direction by way of the trim panel. That is to say, in other words, the protective covering in the case of a vehicle according to the invention preferably bears with its axial wall section, in particular with its inner side, against the cylinder shell-shaped wall section of the cup-shaped first housing part and secondly, in particular with an outer side of its axial wall section, bears at least partially against the trim panel. In this way, additional radial fixing or securing of the protective covering in the radial direction on the vehicle can be achieved in a very simple manner.

The advantageous refinements which are presented in relation to the protective covering and their advantages also apply correspondingly to the flat spiral spring housing arrangement according to the invention and to a motor vehicle according to the invention.

Further features of the invention result from the claims, the figures and the description of the figures. All of the features and combinations of features which are mentioned in the above text in the description and the following features and combinations of features which are mentioned in the description of the figures and/or are shown solely in the figures can be used not only in the respectively specified combination, but rather also in other combinations or else on their own.

Figure 2:
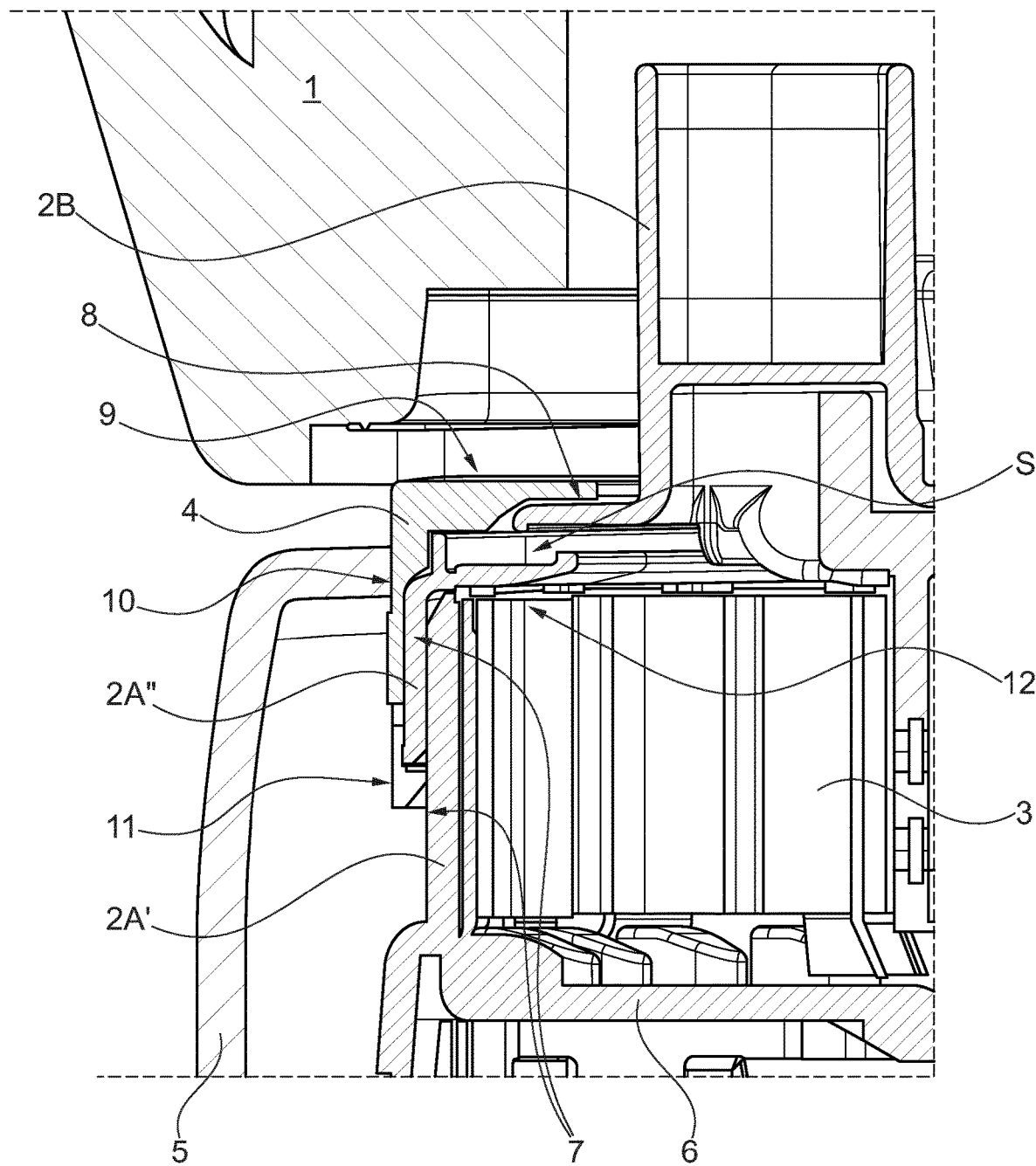
Figure 3A:
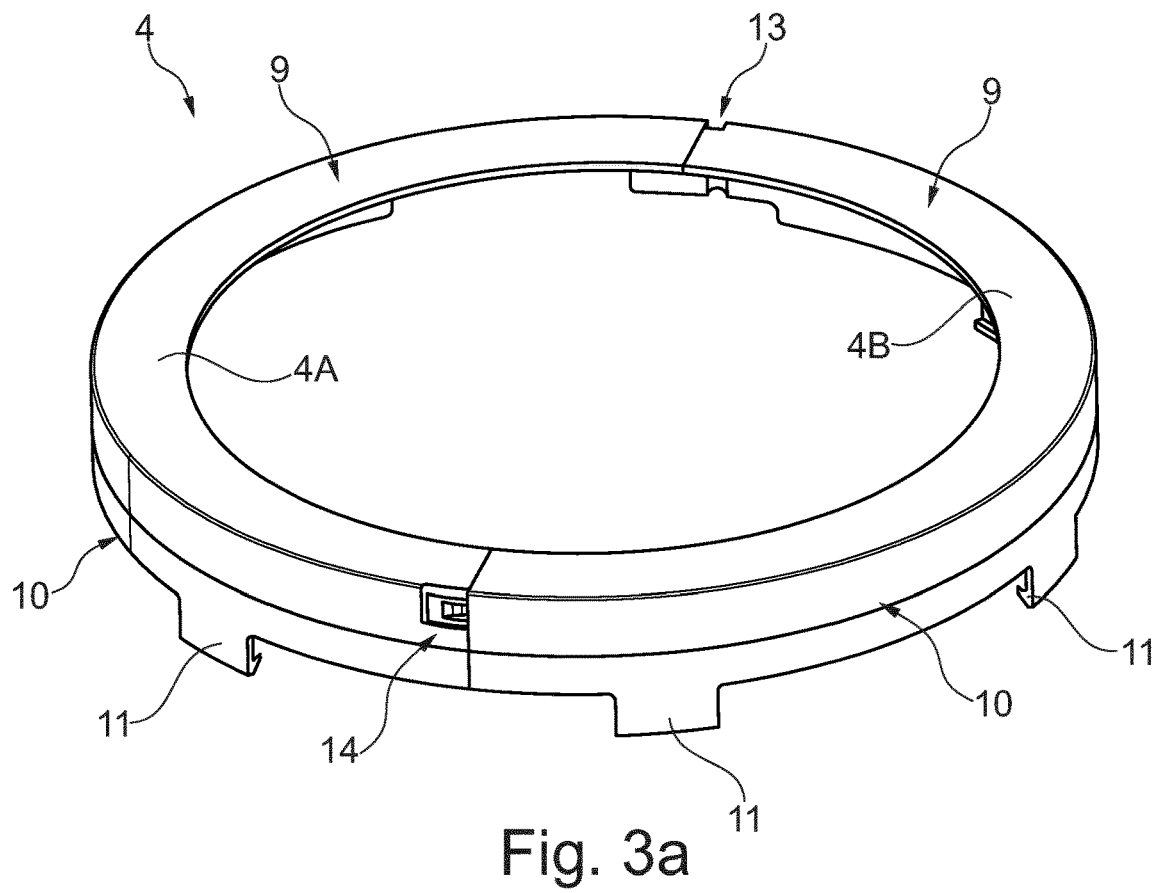
Figure 3B:
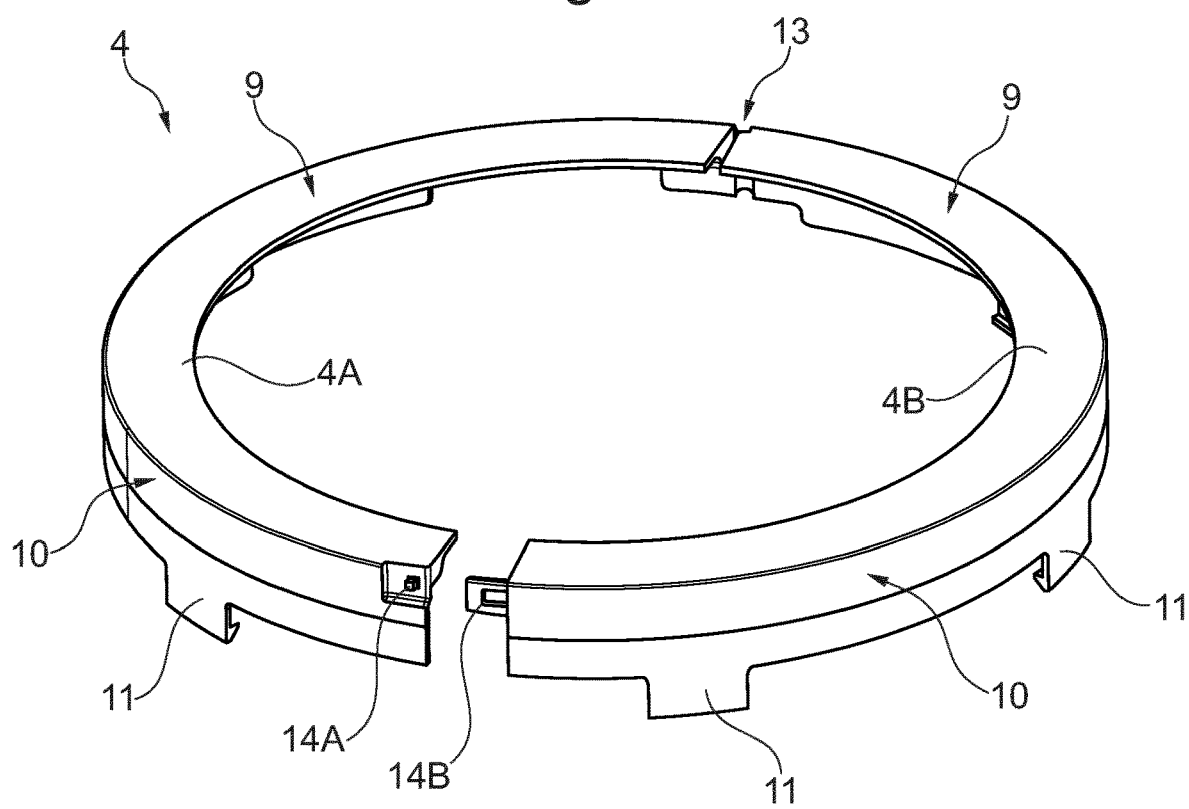

The invention will now be described in greater detail using one preferred exemplary embodiment with reference to the appended drawings, in which:

FIG. 1 shows a section through one exemplary embodiment of a flat spiral spring housing arrangement according to the invention which is arranged in a vehicle, FIG. 2 shows a detail of the flat spiral spring housing arrangement according to the invention from FIG. 1 in an enlarged illustration, FIG. 3A shows the protective covering according to the invention from FIGS. 1 and 2 in a perspective illustration as a single component in a functional use state, and FIG. 3B shows the protective covering according to the invention from FIG. 3A in an assembly state.

FIG. 1 shows one exemplary embodiment of a flat spiral spring housing arrangement according to the invention having a flat spiral spring housing 2 made from plastic and a protective covering 4 according to the invention which is likewise produced from plastic, in a functional installed state in a vehicle between a steering wheel 1 and a steering column module 15 which is surrounded by a trim panel 5. For improved understanding, FIG. 2 shows a detail of the flat spiral spring housing arrangement according to the invention from FIG. 1 in an enlarged illustration.

Here, the flat spiral spring housing 2 consists of a first, cup-shaped housing part 2A with a bottom 6 of annular disc-shaped configuration and with a cylinder shell-shaped wall section 7, and a second housing part 2B which forms a housing cover. A flat spiral spring 3 is arranged within the flat spiral spring housing 2 in a receiving space which is formed by way of the first housing part 2A and the second housing part 2B. Here, the receiving space for the flat spiral spring 3 is formed on an underside by way of the bottom 6 of annular disc-shaped configuration of the first housing part 2A, and by way of the cylinder shell-shaped wall section 7 of the first housing part 2A and by way of the annular disc-shaped section 8 of the second housing part 2B which forms a housing cover.

In the case of said exemplary embodiment of a flat spiral spring housing arrangement according to the invention, the first housing part 2A is of multiple-piece configuration (see FIG. 2) and is assembled, in particular, from a first housing part 2A' of cup-shaped configuration and a second housing part 2A" likewise of cup-shaped configuration, the second housing part 2A" of cup-shaped configuration having an annular disc-shaped section 12 which extends inwards in the radial direction and extends in the manner of a labyrinth seal between the annular disc-shaped section 8 of the second housing part 2B and the cylinder shell-shaped wall section 7 of the first housing part 2A into the interior of the flat spiral spring housing 2.

The first housing part 2A is configured as a stator and is fastened in a stationary or fixed manner to the vehicle body via the steering column module 15, whereas the second housing part 2B acts as a rotor and is connected fixedly to a steering column (not shown here) so as to rotate with it, which steering column can be rotated about a rotational axis L, together with the steering wheel 1 which is likewise fastened fixedly to the steering column so as to rotate with it. That is to say, the first housing part 2A and the second housing part 2B rotate with respect to one another in the case of every steering movement.

In order that the second housing part 2B can be rotated with respect to the first housing part 2A in a manner which is as free from friction as possible, there is a gap S between the annular disc-shaped section 2B of the second housing part and the first housing part 2A, in particular between the annular disc-shaped section 2B of the second housing part and the annular disc-shaped section of the second cup-shaped housing part 2A", which gap S is covered according to the invention by way of the protective covering 4 according to the invention from the outside.

To this end, the protective covering 4 according to the invention has an annular disc 9 which extends inwards in the radial direction, and an axial wall section 10, the protective covering 4 lying with its annular disc 9 on the annular disc-shaped section 8 of the second housing part 2B on the outside in order to seal the gap S in the case of said flat spiral spring housing arrangement according to the invention. In this case, furthermore, the annular disc 9 of the protective covering 4 according to the invention is of completely circumferential configuration, in relation to a functional use state (see FIG. 3A), with the result that, in the case of the flat spiral spring housing arrangement according to the invention, the gap S is sealed over the entire circumference. As a result, the penetration of foreign bodies, such as hairs or the like, into the flat spiral spring housing 2 can be prevented in a very effective manner.

Furthermore, the protective covering 4 bears with its axial wall section 10 against the flat spiral spring housing 2 on the outside, more precisely against the cylinder shell-shaped wall section 7 of the first housing part 2A, in particular against the second cup-shaped housing part 2A" and against the trim panel 5. As a result, the protective covering 4 is sufficiently fixed with respect to the flat spiral spring housing 2 in the radial direction for reliable covering of the gap 2.

For axial fixing of the protective covering 4 on the flat spiral spring housing 2, the protective covering 4 has a plurality of latching elements in the form of latching hooks 11 which are arranged uniformly distributed in the circumferential direction (see also FIGS. 3A and 3B), the latching hooks 11 engaging in each case behind a projection on the cylindrical wall section 7 of the first housing part 2A, the projections being formed in this case in each case by way of a lower edge of the second cup-shaped housing part 2A" (see FIG. 2, in particular).

In order to reduce the friction between the protective covering 4 and the second housing part 2B, which co-rotates with the steering wheel 1, and the steering wheel 1, the surface of the protective covering 4 has a low roughness, in particular a low coefficient of friction, on an underside of the annular disc 9, that is to say on the side which faces the second housing part 2B, and on an upper side, that is to say on the side which faces the steering wheel 1. Furthermore, the annular disc 9 is of anti-static configuration in this region, in order to prevent static charging, it possibly being advantageous in some cases for the entire protective covering 4 to be of anti-static configuration.

Said exemplary embodiment of a protective covering 4 according to the invention is formed from two half-ring segments 4A and 4B (see FIGS. 3A and 3B) which are connected at two first, adjacent ring segment ends by means of an integral hinge 13, and can be connected to one another or are connected to one another in a functional use state at the other two adjacent ring segment ends by means of a releasable latching connection 14.

To this end, the protective covering 4 has a latching projection 14A at one of the second ring segment ends and a latching hook 14B at the other second ring segment end. Here, the latching elements of the latching connection 14, that is to say the latching projection 14A and the latching hook 14B, are advantageously arranged in the region of the axial wall section 10.

The integral hinge 13, by way of which the two first, adjacent ring segment ends are connected, extends in the axial direction along the axial wall sections 10, with the result that the ring segment ends are connected to one another only in the region of the axial wall sections 10, but not in the region of the annular disc 9.

By virtue of the fact that the protective covering 4 is formed by way of two half-ring segments 4A and 4B which are connected to one another on one side by means of an integral hinge 13 and can be connected releasably on the other side by means of a latching connection 14, the protective covering 4 can be mounted in the radial direction, that is to say can be arranged from the outside around the flat spiral spring housing 2 in a state in which it is already installed in a vehicle, without dismantling of the steering wheel 1 being required. This makes particularly simple retrofitting of a protective covering 4 according to the invention possible, and/or particularly simple, subsequent fastening to a flat spiral spring housing 2.

It goes without saying that a multiplicity of structural modifications with respect to the described exemplary embodiment are possible, without departing from the scope of the patent claims.

The invention claimed is:

1. A protective covering for sealing a flat spiral spring housing which has a first housing part and at least a second housing part which forms a housing cover, the first housing part forming, with the at least the second housing part, a receiving space for a flat spiral spring, the two housing parts being rotatable with respect to one another, and the flat spiral spring housing having a gap between the first housing part and the at least the second housing part, the protective covering comprising:

an annular disc which extends in a radial direction at least over part of a circumference and a wall section which adjoins an outer edge of the annular disc and extends at least over part of the circumference in an axial direction, wherein the protective covering is configured to be connected to the flat spiral spring housing so that, in a functional state in which the protective covering is connected to the flat spiral spring housing to form a flat spiral spring housing arrangement, the protective covering covers the gap between the first housing part and the at least the second housing part of the flat spiral spring housing from an outside, wherein the protective covering is configured so that, in a state in which the protective covering is connected to the flat spiral spring housing to form a flat spiral spring housing arrangement, an axial wall section of the protective covering bears in the radial direction against the flat spiral spring housing, against the first housing part in a completely circumferential manner, and is fixed in the radial direction with respect to the flat spiral spring housing as a result, and wherein the protective covering bears against the flat spiral spring housing on the outside in a region of a cylinder shell-shaped wall section of the first housing part.

2. The protective covering according to claim 1, wherein the protective covering can be connected to the flat spiral spring housing so that, in a state in which the protective covering is connected to the flat spiral spring housing to form a flat spiral spring housing arrangement, the annular disc of the protective covering covers the gap from the outside, the annular disc of the protective covering to this end extending in the radial direction beyond a gap width and being of completely circumferential configuration.

3. The protective covering according to claim 1, wherein the axial wall section of the protective covering is connected to the flat spiral spring housing so that, in a state in which the protective covering is connected to the flat spiral spring housing to form a flat spiral spring housing arrangement, the axial wall section of the protective covering covers the gap from the outside, the axial wall section of the protective covering to this end extending in the axial direction beyond a gap height and being of completely circumferential configuration.

4. The protective covering according to claim 1, wherein, for axial fixing with respect to the flat spiral spring housing, the protective covering has a plurality of latching elements comprising elastically resilient latching hooks, in a manner which is distributed in the circumferential direction, in a uniformly distributed manner, on its axial wall section to establish a latching connection to the first housing part.

5. The protective covering according to claim 1, wherein the protective covering is formed from at least two ring segments from two half-ring segments.

6. The protective covering according to claim 5, wherein two first, adjacent ring segment ends are connected to one another by means of a hinge by an integral hinge, only the axial wall sections of the ring segment ends being connected by the hinge.

7. The protective covering according to claim 5, wherein two other, adjacent ring segment ends are connected to one another or are connected to one another by a latching connection.

8. The protective covering according to claim 1, wherein the annular disc of the protective covering has a surface with a low coefficient of friction, on a side which faces the at least the second housing part which is configured as a rotor in a functional installed state in a vehicle.

9. The protective covering according to claim 1, wherein at least one side of the annular disc of the protective covering which, in a functional installed state in a vehicle, faces the at least the second housing part which is configured as a rotor has an anti-static surface, an entire protective covering having an anti-static surface and the entire protective covering being of anti-static configuration.

10. A flat spiral spring housing arrangement comprising:
a flat spiral spring housing; and
a protective covering,
the flat spiral spring housing having a first housing part and at least a second housing part which forms a housing cover,
the first housing part forming, with the at least the second housing part, a receiving space for a flat spiral spring, the two housing parts being rotatable with respect to one another, and the flat spiral spring housing having a gap between the first housing part and the at least the second housing part,
wherein the protective covering is configured according to claim 1 and covers the gap from the outside.

11. The flat spiral spring housing arrangement according to claim 10, wherein the first housing part is a first cup-shaped housing part with a bottom having an annular disc-shaped configuration with the cylinder shell-shaped wall section, and the at least the second housing part has at least one annular disc-shaped section, the annular disc-shaped section of the at least the second housing part extending in the radial direction and being arranged spaced apart in the axial direction from the bottom having the annular disc-shaped configuration of the first housing part, and forming, with the first housing part, the receiving space for a flat spiral spring, and the gap being situated between the first housing part and the at least the second housing part.

12. The flat spiral spring housing arrangement according to claim 10, wherein the annular disc of the protective covering covers the gap in the flat spiral spring housing from the outside, the annular disc of the protective covering to this end extending in the radial direction beyond a gap width and being of completely circumferential configuration.

13. The flat spiral spring housing arrangement according to claim 10, wherein the axial wall section of the protective covering covers the gap from the outside, the axial wall section of the protective covering to this end extending in the axial direction beyond a gap height and being of completely circumferential configuration.

14. The flat spiral spring housing arrangement according to claim 10, wherein the axial wall section of the protective covering bears in the radial direction on the outside against the first housing part in a completely circumferential manner, and, as a result, is fixed in the radial direction with respect to the flat spiral spring housing.

15. The flat spiral spring housing arrangement according to claim 10, wherein, for axial fixing with respect to the flat spiral spring housing, the protective covering is connected to the flat spiral spring housing by a plurality of latching connections which are arranged in a uniformly distributed manner in the circumferential direction, the protective covering to this end having a plurality of latching elements comprising elastically resilient latching hooks, in a manner which is distributed uniformly in the circumferential direction, on its axial wall section, and the flat spiral spring housing having a plurality of latching projections of corresponding configuration, the said latching projections being arranged on the cylinder shell-shaped wall section of the first housing part.

16. A double-track vehicle, having a flat spiral spring housing arrangement with a flat spiral spring housing and a protective covering, wherein the flat spiral spring housing arrangement is configured according to claim 10, and the protective covering comprises an annular disc which extends in the radial direction at least over part of a circumference and a wall section which adjoins an outer edge of the annular disc and extends at least over part of the circumference in the axial direction, wherein the protective covering is configured to be connected to the flat spiral spring housing so that, in a functional state in which the protective covering is connected to the flat spiral spring housing to form a flat spiral spring housing arrangement, the protective covering covers the gap between the first housing part and the at least the second housing part of the flat spiral spring housing from the outside.

17. A protective covering for sealing a flat spiral spring housing which has a first housing part and a second housing part which forms a housing cover, the first housing part forming, with the second housing part, a receiving space for a flat spiral spring, the two housing parts being rotatable with respect to one another, and the flat spiral spring housing having a gap between the first housing part and the second housing part, the protective covering comprising:

an annular disc which extends in a radial direction at least over part of a circumference and a wall section which adjoins an outer edge of the annular disc and extends at least over part of the circumference in the axial direction, wherein the protective covering is configured to be connected to the flat spiral spring housing so that, in a functional state in which the protective covering is connected to the flat spiral spring housing to form a flat spiral spring housing arrangement, the protective covering covers the gap between the first housing part and at least the second housing part of the flat spiral spring housing from the an outside, and wherein the protective covering is formed from at least two ring segments from two half-ring segments.

18. A protective covering for sealing a flat spiral spring housing which has a first housing part and a second housing part which forms a housing cover, the first housing part forming, with the second housing part, a receiving space for a flat spiral spring, the two housing parts being rotatable with respect to one another, and the flat spiral spring housing having a gap between the first housing part and the second housing part, the protective covering comprising:

an annular disc which extends in a radial direction at least over part of a circumference and a wall section which adjoins an outer edge of the annular disc and extends at least over part of the circumference in the axial direction, wherein the protective covering is configured to be connected to the flat spiral spring housing so that, in a functional state in which the protective covering is connected to the flat spiral spring housing to form a flat spiral spring housing arrangement, the protective covering covers the gap between the first housing part and at least the second housing part of the flat spiral spring housing from the an outside, and wherein the annular disc of the protective covering has a surface with a low coefficient of friction, on a side which faces the second housing part which is configured as a rotor in a functional installed state in a vehicle.

* * * * *